United States Patent Office 3,135,709
Patented June 2, 1964

3,135,709
SYNTHETIC RESINOUS COMPOSITIONS COMPRISING A CHLORINATED DIPHENYL AND SOLUTIONS OF LACQUERS AND PAINTS MADE THEREOF
Lennart Otto Lars Erik Lüneburg and Rolf Filip Arnold Jansson, both of Lovholmsgrand 12, Stockholm, Sweden
No Drawing. Filed Jan. 31, 1961, Ser. No. 85,965
Claims priority, application Great Britain Feb. 3, 1960
2 Claims. (Cl. 260—21)

This invention relates to improvements in or relating to synthetic resin compositions suitable for the production of solutions of stoving varnishes and also comprises pigmented and unpigmented varnish solutions prepared therefrom.

In the British patent specification No. 665,195 there are described synthetic resin compositions suitable for the production of stoving varnishes. A particular advantage of these synthetic resin compositions is that their aqueous solutions may be used for the production of stoving varnishes. The use of aqueous stoving varnish solutions presents substantial advantages in comparison to the previously customary use of varnish solutions in organic solvents only; first of all on account of the fact that the use of organic solvents involves certain fire hazards and also in view of the unavoidable losses of the comparatively expensive organic solvents by evaporation or for other reasons.

The synthetic resin compositions according to the British patent specification No. 665,195 suitable for the production of aqueous stoving varnishes consist of the three following components:

(1) A mixture of hardenable low-molecular methylol compounds, which, to the major part at least, are water soluble, consisting of phenol alcohols or aminoplastics and being free from caustic alkaline catalysts which may have been employed in producing them, (2) A modified or unmodified alkyd resin at least partially obtained from components with long-chained preferably unbranched aliphatic groups and which consequently exercises a plasticising action, and which carries free carboxylic and numerous hydrophilic groups, the latter consisting, predominantly at least, of hydroxyl groups, corresponding to a hydroxyl equivalent number of about 150 to 250, and a sufficient quantity of (3) Ammonia of a watersoluble mono- or polybasic strong organic nitrogen base to form with component (2) a soap which is dilutable with water.

The synthetic resin compositions according to the said British patent specification usually also contain a fourth component, viz. a solvent. Thus, derived from the production of the first and the second component mentioned above they contain as a rule a certain quantity of water and if ammonia has been used as the third component this also applies to that component. It is suitable that the said fourth component, i.e. the solvent, does not only consist of water but in admixture with water also contains an organic solvent which completely or at least in a high degree is miscible with water, for instance a low molecular monohydric or polyhydric alcohol.

Due to the content of the said fourth component the synthetic resin compositions according to the said British patent specification for the production of aqueous stoving varnishes are liquids having a high viscosity.

As already mentioned the synthetic resin compositions according to the British patent specification No. 665,195 show a special advantage in that they are suitable for the production of aqueous solutions which may be used as stoving varnishes. The solubility properties of these synthetic resin compositions are comparatively complicated and partly dependent on the special nature of the first and second components present therein. In all cases, however, it is possible to produce aqueous solutions therefrom having a solids content of about 25–70% by weight and useful for the production of stoving varnishes.

The present invention relates to a further improvement of the above-described synthetic resin compositions which are suitable for the production of stoving varnish solutions. The invention also comprises pigmented or unpigmented stoving varnish solutions produced from these synthetic resin compositions. The present invention is particularly important in connection with synthetic resin compositions of the type described which as the first component contain a low-molecular water-soluble condensation product of a polyvalent amine, in particular melamine and benzoguanamine, and aldehydes, in particular formaldehyde. These synthetic resin compositions containing triazine-formaldehyde resins are especially advantageous due to the fact that they give varnish coatings and films which are characterized by an especially high hardness and chemical resistance. However, it has been found that when these synthetic resin compositions are used in the form of aqueous solutions for the production of stoving varnishes the adherence to the substrate is not very good and furthermore may be substantially reduced by the presence of impurities even in small amounts on the substrate. Also the water resistance of the varnish coatings and films is not always fully satisfactory. The present invention accomplishes in this respect an essential improvement.

As already mentioned the invention relates to synthetic resin compositions which in particular are suitable for the production of aqueous stoving varnishes and which contain the following components: a low-molecular still water-soluble or at least water-dispersible hardenable condensation product of a polyvalent amine, especially triazine, and an aldehyde, especially formaldehyde, furthermore a saturated or unsaturated, if desired modified polyester resin having free carboxylic groups, and, if desired, other hydrophilic groups, such as hydroxyl groups, furthermore an alkaline compound, such as ammonia, or a water-soluble monovalent or polyvalent organic nitrogen base and finally a solvent mixture which consists of water and, if desired, of an organic solvent completely or at least in a substantial degree miscible with water, for instance a monohydric or polyhydric low-molecular alcohol. It should also be noted that according to the British patent specification No. 665,195 a certain number of free hydroxyl groups preferably are to be present in the polyester component. However, the object of the said patent specification is not restricted to the use of polyester resins containing free hydroxyl groups. Thus, in Example IV of the said patent specification a polyester resin is used which is completely free from hydroxyl groups. The present invention which relates to improvements in the object of the said patent specification is not restricted to the use of polyester resins with free hydroxyl groups either. However, the use of polyester resins having free hydroxyl groups is preferred since it gives particularly useful results.

The present invention is characterized by the fact that the synthetic resin composition as a further component contains an organic polar compound which is insoluble or difficultly soluble in water and which contains one or more negative substituents. As polar organic compounds having negative substituents there are preferably used neutral aliphatic and aromatic phosphoric acid esters, for instance trichloro-triethyl phosphate, trichlorotributyl phosphate, diphenyl xylenyl phosphate and diphenyl monocresyl phosphate, furthermore certain aliphatic compounds such as high-molecular water-insoluble polyethylene glycols or derivatives thereof and acetals or ketals, particularly those containing phenoxy groups, for instance diphenoxyethyl formal. It is furthermore possible to use aromatic hydrocarbons, which may have several nuclei and which may be halogenated or may contain nitro groups or a sulfonyl ($SO_2$) group and also phenolic hydroxyl groups. As examples of aromatic substituted hydrocarbons which may be used according to the invention there may be mentioned chlorinated diphenyl having a chlorine content between 40 and 60%. All these organic compounds are as mentioned above of polar nature and contain a negative substituent. They are furthermore insoluble or difficultly soluble in water. The additional component of the synthetic resin composition used according to the invention has to be comparatively low-volatile, i.e. has to have a boiling point above 100° C., preferably even above 300° C., so that the additional component at the baking temperature substantially does not vaporise but remains in the varnish layer.

The quantity of the component additionally used according to the invention may vary within comparatively wide limits and may be between 1 and 15% by weight calculated upon the solids content of the synthetic resin composition. The additional component is preferably used in a quantity of from 4 to 8% by weight calculated upon the solids content of the synthetic resin composition.

The synthetic resin compositions according to the invention differ from those of the British patent specification No. 665,195 as already mentioned in that they contain an additional component, viz. a polar organic compound having one or more negative substituents. These synthetic resins are liquids having a high viscosity as are the synthetic resin compositions according to the said British patent specification. The new synthetic resin compositions are highly suitable for the production of aqueous stoving varnish solutions but can also be used for the production of varnish solutions in organic varnish solvents, for instance in monohydric or polyhydric alcohols or in an aromatic hydrocarbon, such as xylene. The invention does not only comprise the new synthetic resin compositions but also comprises pigmented or unpigmented varnish solutions produced by the use of these synthetic resin compositions. The solids content in the varnish or paint solutions may vary in an essential degree and in most cases there are used solutions which have a solids content of about 20 to about 70% by weight. In many cases it has been found expecially suitable to use solutions having a solids content of between 33 and 66% by weight.

The proportions of the various components in the synthetic resin compositions according to the invention may vary within wide limits. The proportion of the second component, i.e. the polyester resin, is usually substantially larger than the proportion of the first component, i.e. the low-molecular amine-aldehyde condensation product. In most synthetic resin compositions according to the invention the proportion of the second component is two to seven times larger than the proportion of the first component. Furthermore, the total proportion of the first two components is about 75–95% by weight calculated upon the solids content of the whole synthetic resin composition. The proportion of the third component, i.e. the alkaline compound, can vary between 5 and 16% by weight and is preferably about 8% by weight calculated upon the solids content of the synthetic resin composition. The content of the organic water-miscible solvents in the synthetic resin compositions may vary within wide limits and may be as low as 1% by volume but in other cases for example about 15 to 20% by volume.

The synthetic resin compositions according to the invention may furthermore contain various substances usually added to this kind of compositions. As a hardening-promoting addition there may be added acids or acidic compounds, for instance partial esters of polybasic acids. These additions, however, are needed in only very small quantities since they are to have a catalytic influence only during the hardening of the resin composition.

To improve the dilutability with water the synthetic resin compositions of the invention can also contain partial ethers of polyhydric alcohols, for instance the ethyl or butyl half-ethers of glycol.

The new synthetic resin compositions can be used for the same purposes as the resin compositions described in the British patent specification No. 665,195. As regards the several variation possibilities reference is also made to the said patent specification. The advantages of the new synthetic resin masses are above all that the adherence properties of the varnish coatings and films produced by the use of these compositions is improved and that furthermore an increase of the resistance against chemicals and the prolonged action of water is obtained. Furthermore, the varnish coatings and films produced by the use of the new synthetic resin compositions have better film properties than varnish coatings and films produced without the addition of the additional component of the invention. The varnish coatings and films are also more ductile and tough, for example. Another advantage obtained according to the invention is that the additional component improves the compatability between the first component, i.e. the low-molecular amine-aldehyde condensation product, for example of melamine and formaldehyde, and the second component, viz. the polyester resin. The conjoint action between the various components of the synthetic resin compositions is compartively complicated. It is possible, however, that the second component, viz. the polyester resin, or the soap formed from this resin and the third component, viz. the alkaline compound, acts as a solubilizer for the additional component consisting of an organic compound insoluble or difficultly soluble in water. The synthetic resin compositions for the production of aqueous stoving varnish solutions becomes more suitable by the said additional component and the dilutability with water becomes increased which is the more surprising as this additional component is insoluble or difficultly soluble in water.

The new synthetic resin compositions are especially suited for the production of varnish coatings and films which are not to be used in closed rooms, thus for example for the application of varnish to the body of motorcars which often are subjected to the action of rain and snow. It is particularly suitable that the varnish films and coatings produced from the synthetic resin compositions of the invention maintain their gloss also after prolonged subjection to the action of humidity.

Whereas the previously known synthetic resin compositions of a similar kind when used for the production of stoving varnish solutions require a very thorough cleaning of the substrate to which the varnish is to be applied, the varnishes produced from the synthetic resin compositions of the invention are characterized by their greater tolerance against small quantities of impurities, for example particles of fat or soot, on the substrate.

Another advantage obtained according to the invention is that it is also possible to use polyester resins which are hydrophilic only to a limited extent for the synthetic resin compositions. Surprisingly the additional component which is insoluble or difficultly soluble in water promotes the dilutability of the varnish solutions with water also in these cases.

Where solutions of the synthetic resin compositions are mentioned above this term is also meant to comprise those cases in which the resin is not dissolved but only finely dispersed in the solvent.

When the synthetic resin compositions according to the invention are used for the production of pigmented varnish solutions or dispersions the usual inorganic or organic pigments may be used.

The following examples illustrate the invention without restricting the same since there are many other variation possibilities. In these examples the statements of parts by weight are calculated on the commercial products. It should be noted in these cases that the melamine resins usually contain about 50% of solids and that the polyester resins usually contain about 80% of solids.

Example I

Eleven parts by weight of a partially methylated low molecular condensation product of melamine having about 5 methylol groups and formaldehyde are admixed with 65 parts by weight of a polyester resin according to Example II of the British patent specification No. 665,195, 4 parts by weight of triethylamine, 5 parts by weight of diphenylxylenyl phosphate and 15 parts by weight of butyl glycol. The mixture is a high-viscous liquid from which aqueous stoving varnish solutions having a solids content of 20–70% by weight can be produced.

Example II

Twenty-six parts by weight of a partially ethyl-glycol etherified low-molecular condensation product of a mixture of 50% by weight of melamine and 50% by weight of benzoguanamine with formaldehyde (about four moles of formaldehyde per mole of triazine) are admixed with 55 parts by weight of a polyester resin according to Example III of the British patent specification No. 665,195, 4 parts by weight of triethylamine, 5 parts by weight of trichlorotriethyl phosphate and 10 parts by weight of ethyl alcohol. The mixture is a high-viscous liquid from which aqueous stoving varnish solutions having a solids content of 20–70% by weight can be produced.

Example III

Twenty parts by weight of a condensation product of 75% by weight of melamine and 25% by weight of benzoguanamine with formaldehyde (about 4 moles of formaldehyde per mole of triazine) are admixed with 60 parts by weight of a polyester resin according to Example V of the British patent specification No. 665,195, 5 parts by weight of dimethylethanolamine, 4 parts by weight of a chlorinated aromatic hydrocarbon having a chlorine content of between 40 and 60% by weight and 11 parts by weight of isopropanol. The mixture is a high-viscous liquid from which aqueous stoving varnish solutions having a solids content of 20–70% by weight can be produced.

Example IV

Eleven parts by weight of a triazine resin obtained from benzoguanamine and formaldehyde, 55 parts by weight of a polyester resin and 4.5 parts by weight of diphenoxyethyl formal are heated at 80° C. for one hour. Thereupon 10 parts by weight of a mixture of alcohol and butylglycol are added. At about 50° C. 15.5 parts by weight of a hydrophilic methylated low-molecular melamine-formaldehyde resin and thereafter 4 parts by weight of dimethyl-mono-ethanolamine are added. The solution thus obtained is especially adapted as a binder in water-soluble primers which upon hardening have a particularly good water-resistance.

In this experiment a polyester resin component produced in the following manner, can preferably be used:

From 100 parts by weight of dehydrated castor oil and 50 parts by weight of linseed oil as well as 45 parts by weight of trimethylol propane a fatty acid monoester of trimethylol propane is produced in a manner known per se. Upon further addition of 35 parts by weight of trimethylol propane the mixture is esterified with 100 parts by weight of phthalic acid anhydride until an acid number of about 60–70 has been obtained.

What we claim is:

1. A composition of matter being water soluble, at least in the presence of a subordinate proportion of organic water-miscible solvent which comprises the combination product of the following components: (I) a hydrophilic, hardenable, low molecular methylol compound being a reaction product of formaldehyde with a triazine, the hardening capacity of which is diminished by partial etherification of methylol groups in the product with a low molecular weight monohydric alcohol, (II) a plasticizing alkyd resin in the production of which resin a considerable excess of alcoholic OH groups over COOH groups is employed, said resin having an acid number of at least about 40 and having 1 gram hydroxyl group in 150 to 250 grams of said resin, (III) a water-soluble base selected from the group consisting of ammonia and strong organic nitrogen bases, said base forming a soap with (II), and (IV) 4 to 8 percent by weight calculated upon the solids content of the composition of chlorinated diphenyl having a chlorine content between 40 and 60 percent, said composition being substantially neutral.

2. A synthetic resin composition comprising a low-molecular, at least water-dispersible, hardenable condensation product of a polyvalent amine and an aldehyde, a polyester resin containing free carboxylic groups, a volatile base selected from the group consisting of ammonia, strong monovalent organic nitrogen base and polyvalent organic nitrogen base, said composition being characterized in that it further comprises 4 to 8 percent based on the solids content of the synthetic resin composition of chlorinated diphenyl having a chlorine content between 40 and 60 percent.

References Cited in the file of this patent

UNITED STATES PATENTS

| 2,577,281 | Simon et al. | Dec. 4, 1951 |
| 2,957,836 | Culbertson et al. | Oct. 25, 1960 |

FOREIGN PATENTS

| 665,195 | Great Britain | Mar. 15, 1949 |
| 532,296 | Canada | Oct. 30, 1956 |